United States Patent
Kimura et al.

(10) Patent No.: US 12,479,159 B2
(45) Date of Patent: Nov. 25, 2025

(54) HEAD UNIT AND INKJET PRINTER

(71) Applicant: MIMAKI ENGINEERING CO., LTD., Nagano (JP)

(72) Inventors: Toshihiro Kimura, Nagano (JP); Masayuki Furuse, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 96 days.

(21) Appl. No.: 18/571,244

(22) PCT Filed: Apr. 18, 2022

(86) PCT No.: PCT/JP2022/017989
§ 371 (c)(1),
(2) Date: Dec. 17, 2023

(87) PCT Pub. No.: WO2023/276416
PCT Pub. Date: Jan. 5, 2023

(65) Prior Publication Data
US 2024/0286348 A1    Aug. 29, 2024

(30) Foreign Application Priority Data

Jun. 29, 2021    (JP) ................. 2021-107212

(51) Int. Cl.
| | | |
|---|---|---|
| *B33Y 30/00* | (2015.01) | |
| *B29C 64/209* | (2017.01) | |
| *B29C 64/232* | (2017.01) | |
| *B29C 64/236* | (2017.01) | |
| *B29C 64/241* | (2017.01) | |
| *B41J 2/21* | (2006.01) | |
| *B41J 25/00* | (2006.01) | |
| *B29C 64/255* | (2017.01) | |

(52) U.S. Cl.
CPC ......... *B29C 64/209* (2017.08); *B29C 64/232* (2017.08); *B29C 64/236* (2017.08); *B29C 64/241* (2017.08); *B33Y 30/00* (2014.12); *B41J 2/2103* (2013.01); *B41J 25/003* (2013.01); *B29C 64/255* (2017.08)

(58) Field of Classification Search
None
See application file for complete search history.

(56) References Cited

FOREIGN PATENT DOCUMENTS

| JP | 2006 231 802 A | * | 9/2006 |
| JP | 2006231802 | | 9/2006 |

(Continued)

OTHER PUBLICATIONS

"International Search Report (Form PCT/ISA/210) of PCT/JP2022/017989", mailed on Jul. 5, 2022, with English translation thereof, pp. 1-6.

Primary Examiner — Mohammad M Ameen
(74) Attorney, Agent, or Firm — JCIPRNET

(57) ABSTRACT

In the head unit 15, an opening 14a for exposing the nozzle surface of an inkjet head 3 and an opening 14b for exposing the nozzle surface of an inkjet head 4 are formed in a base member 14, and the width of the opening 14a in the sub scanning direction is set to a width at which the inkjet head 3 can be arranged at a first position 3A where the inkjet head 3 and the inkjet head 4 are arranged at the same position in the sub scanning direction and a second position where the inkjet head 3 and the inkjet head 4 are arranged at positions shifted in the sub scanning direction.

20 Claims, 5 Drawing Sheets

(56) References Cited

FOREIGN PATENT DOCUMENTS

| JP | 2018 103 427 A | * | 7/2018 |
|----|----------------|---|--------|
| JP | 2018103427 | | 7/2018 |
| JP | 2019188759 | | 10/2019 |

\* cited by examiner

HEAD UNIT AND INKJET PRINTER

CROSS-REFERENCE TO RELATED APPLICATION

This application is a 371 application of the International PCT application serial no. PCT/JP2022/017989, filed on Apr. 18, 2022, which claims the priority benefits of Japan Patent Application No. 2021-107212, filed on Jun. 29, 2021. The entirety of the above-mentioned patent application is hereby incorporated by reference herein and made a part of this specification.

TECHNICAL FIELD

The present invention relates to a head unit including a plurality of inkjet heads. The present invention also relates to an inkjet printer including such a head unit.

BACKGROUND ART

Conventionally, an inkjet printer that performs printing by ejecting ink onto a print medium is known (see, e.g., Patent Literature 1). The inkjet printer described in Patent Literature 1 includes two inkjet heads, a head holding mechanism that holds the two inkjet heads, and a carriage on which the two inkjet heads and the head holding mechanism are mounted. The two inkjet heads are arranged at positions shifted from each other in a main scanning direction. The inkjet heads each eject ink downward. The lower surface of each of the inkjet heads is a nozzle surface on which a plurality of nozzles for ejecting ink are formed.

In the inkjet printer described in Patent Literature 1, the head holding mechanism includes a base member fixed to the carriage. An opening (through hole) for exposing the nozzle surfaces of the inkjet heads is formed in the base member. In FIG. 4 and the like of Patent Literature 1, the two inkjet heads are arranged at the same position in a sub scanning direction. That is, in FIG. 4 and the like of Patent Literature 1, the two inkjet heads are arranged in-line. Furthermore, in FIG. 10 and the like of Patent Literature 1, the two inkjet heads are arranged at positions shifted from each other in the sub scanning direction. That is, in FIG. 10 and the like of Patent Literature 1, the two inkjet heads are arranged in a staggered manner.

CITATION LIST

Patent Literature

Patent Literature 1: Japanese Unexamined Patent Publication No. 2019-188759

SUMMARY OF INVENTION

Technical Problems

In the inkjet printer described in Patent Literature 1, the position of the opening formed in the base member changes between the case where the two inkjet heads are arranged in-line and the case where the two inkjet heads are arranged in a staggered manner. Therefore, when carrying out the in-line arrangement and the staggered arrangement of the inkjet heads with this inkjet printer, a base member for in-line arrangement in which an opening is formed at a position corresponding to the inkjet heads arranged in-line and a base member for staggered arrangement in which an opening is formed at a position corresponding to the inkjet heads arranged in the staggered manner are required. Therefore, versatility of the base member is reduced.

Furthermore, in the inkjet printer described in Patent Literature 1, when the inkjet heads are arranged in-line, the base member for in-line arrangement needs to be fixed to the carriage, and when the inkjet heads are arranged in a staggered manner, the base member for staggered arrangement needs to be fixed to the carriage. Therefore, in this inkjet printer, the base member needs to be replaced when switching the arrangement of the inkjet heads from the in-line arrangement to the staggered arrangement or when switching the arrangement of the inkjet heads from the staggered arrangement to the in-line arrangement, and hence the switching from the in-line arrangement to the staggered arrangement and the switching from the staggered arrangement to the in-line arrangement become complicated.

Therefore, an object of the present invention is to provide a head unit including a plurality of inkjet heads and a base member to which the plurality of inkjet heads are attached, the head unit capable of enhancing versatility of the base member and easily performing switching from the in-line arrangement to the staggered arrangement and switching from the staggered arrangement to the in-line arrangement even when performing the in-line arrangement and the staggered arrangement of the inkjet heads. Another object of the present invention is to provide an inkjet printer including such a head unit.

Solutions to Problems

In order to solve the above problems, a head unit of the present invention includes: a plurality of inkjet heads each having a nozzle surface on which a plurality of nozzles for ejecting ink are formed; a carriage on which the plurality of inkjet heads are mounted; and a base member fixed to the carriage and to which the plurality of inkjet heads are attached, where portions of the plurality of inkjet heads on the nozzle surface side are attached to the base member, and a plurality of openings for exposing the respective nozzle surfaces of the plurality of inkjet heads are formed in the base member, and assuming that a predetermined inkjet head among the plurality of inkjet heads is a first inkjet head, the inkjet head excluding the first inkjet head among the plurality of inkjet heads is a second inkjet head, and the opening for exposing the nozzle surface of the first inkjet head is a first opening, a width of the first opening in a sub scanning direction orthogonal to a main scanning direction that is a moving direction of the carriage and an up-down direction is set to a width at which the first inkjet head is arrangeable at a first position where the first inkjet head and the second inkjet head are arranged at the same position in the sub scanning direction and a second position where the first inkjet head and the second inkjet head are arranged at positions shifted in the sub scanning direction.

In the head unit of the present invention, the first opening for exposing the nozzle surface of the first inkjet head is formed in the base member, and the width of the first opening in the sub scanning direction is set to a width at which the first inkjet head can be arranged at the first position where the first inkjet head and the second inkjet head are arranged at the same position in the sub scanning direction and the second position where the first inkjet head and the second inkjet head are arranged at positions shifted in the sub scanning direction.

Thus, in the present invention, the first inkjet head and the second inkjet head can be arranged at the same position in the sub scanning direction, and the first inkjet head and the second inkjet head can be arranged at positions shifted in the sub scanning direction using a common base member. That is, in the present invention, the first inkjet head and the second inkjet head can be arranged in line and can be arranged in a staggered manner using a common base member. Therefore, in the present invention, even when in-line arrangement and staggered arrangement of the inkjet heads are performed, versatility of the base member can be enhanced.

Furthermore, in the present invention, since the first inkjet head and the second inkjet head can be arranged in line and can be arranged in a staggered manner using the common base member, it is not necessary to replace the base member when switching the arrangement of the inkjet heads from the in-line arrangement to the staggered arrangement and when switching the arrangement of the inkjet heads from the staggered arrangement to the in-line arrangement.

Therefore, in the present invention, even when the in-line arrangement and the staggered arrangement of the inkjet heads are performed, the switching from the in-line arrangement to the staggered arrangement and the switching from the staggered arrangement to the in-line arrangement can be easily performed.

In the present invention, the head unit preferably includes a closing member for closing a portion of the first opening where the first inkjet head is not arranged. According to such configuration, even if the width of the first opening in the sub scanning direction is wide in order to enable the in-line arrangement and the staggered arrangement of the first inkjet head and the second inkjet head, it is possible to prevent dust and ink mist from entering the inside of the carriage from the first opening.

In the present invention, for example, two inkjet heads of a first inkjet head and a second inkjet head are attached to the base member, and two openings are formed, and a width in the sub scanning direction of the first opening, which is one opening of the two openings, is wider than a width in the sub scanning direction of the other opening.

In the present invention, the head unit preferably includes a first adjustment member for finely adjusting, with respect to the base member, the position in the sub scanning direction of at least one inkjet head of the plurality of inkjet heads. Furthermore, in the present invention, the head unit preferably includes a second adjustment member for finely adjusting, with respect to a base member, a position of at least one inkjet head of the plurality of inkjet heads in a turning direction with an up-down direction as an axial direction of turning. According to such configuration, the positional shift of an inkjet head with respect to the base member and the positional shift among the plurality of inkjet heads can be suppressed. Therefore, the print quality of the inkjet printer can be improved.

The head unit of the present invention can be used in an inkjet printer including a carriage driving mechanism that moves a carriage in a main scanning direction. In this inkjet printer, even when in-line arrangement and staggered arrangement of the inkjet heads are performed, versatility of the base member can be enhanced, and switching from the in-line arrangement to the staggered arrangement and switching from the staggered arrangement to the in-line arrangement can be easily performed.

In the present invention, for example, the inkjet printer carries out printing on the print medium (i.e., carries out two-dimensional printing) in a state where the first inkjet head is arranged at the first position or the second position, and manufactures a three-dimensional shaped object in a state where the first inkjet head is arranged at the first position. In this case, for example, the inkjet printer performs printing on the print medium in a state where the first inkjet head is arranged at the first position, so that printing on the print medium can be easily performed using inks of specific colors such as light colors and orange in addition to the primary color such as CMYK. Further, when the inkjet printer performs printing on the print medium in a state where the first inkjet head is arranged at the second position, it is possible to enjoy the advantage of the staggered arrangement. Furthermore, when the inkjet printer manufactures the three-dimensional shaped object, it is necessary to use more types of ink than two-dimensional printing such as a model material and a support material in addition to the color ink, but by manufacturing the three-dimensional shaped object in a state where the first inkjet head is arranged at the first position, it becomes possible to eject many types of ink in line. That is, in this case, a configuration suitable as an inkjet printer that performs both printing on a print medium and manufacturing of three-dimensional shaping can be obtained. When manufacturing the three-dimensional shaped object, the significance of the support material is lost if the inkjet head that ejects the color ink and the inkjet head that ejects the support material are arranged in a staggered manner.

Effect of the Invention

As described above, in the present invention, even in the case where the in-line arrangement and the staggered arrangement of the inkjet heads are performed, the versatility of the base member to which the plurality of inkjet heads are attached can be enhanced, and the switching from the in-line arrangement to the staggered arrangement and the switching from the staggered arrangement to the in-line arrangement can be easily performed.

DESCRIPTION OF EMBODIMENTS

Hereinafter, embodiments of the present invention will be described with reference to the drawings.

(Schematic Configuration of Inkjet Printer)

Figure 1:
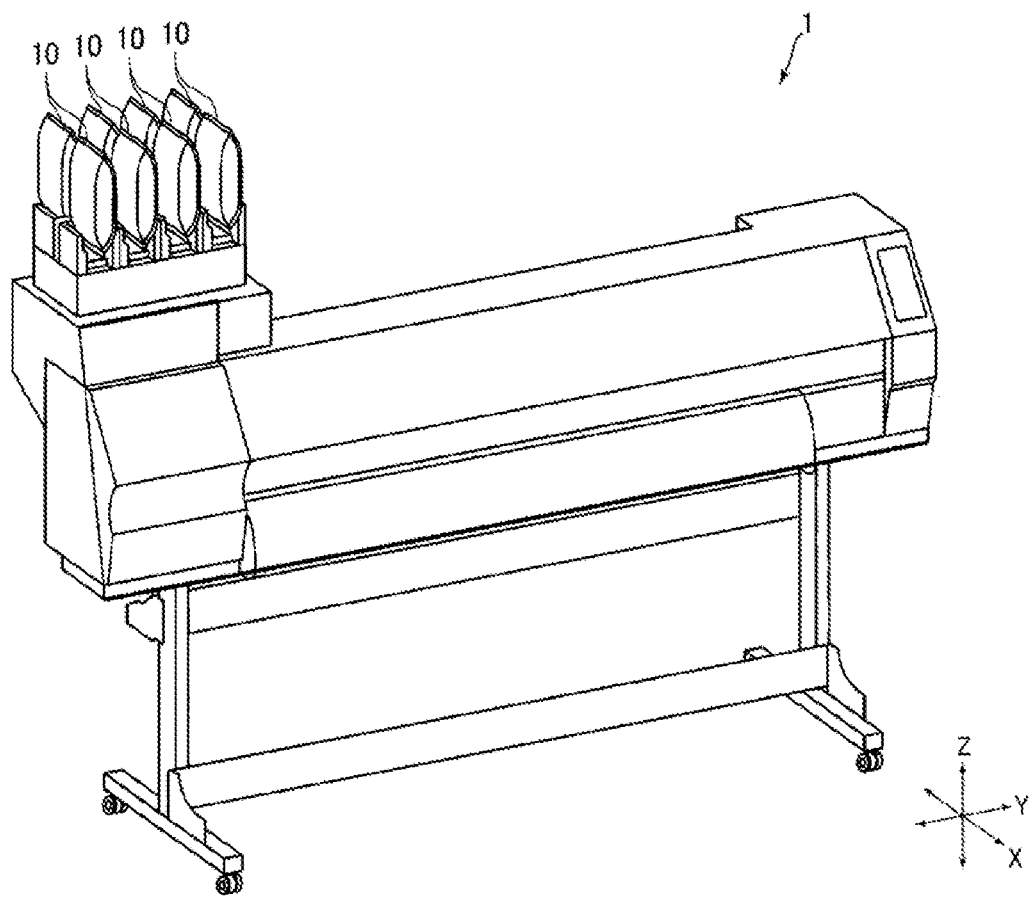
FIG. 1 is a perspective view of an inkjet printer according to an embodiment of the present invention.
Figure 2:
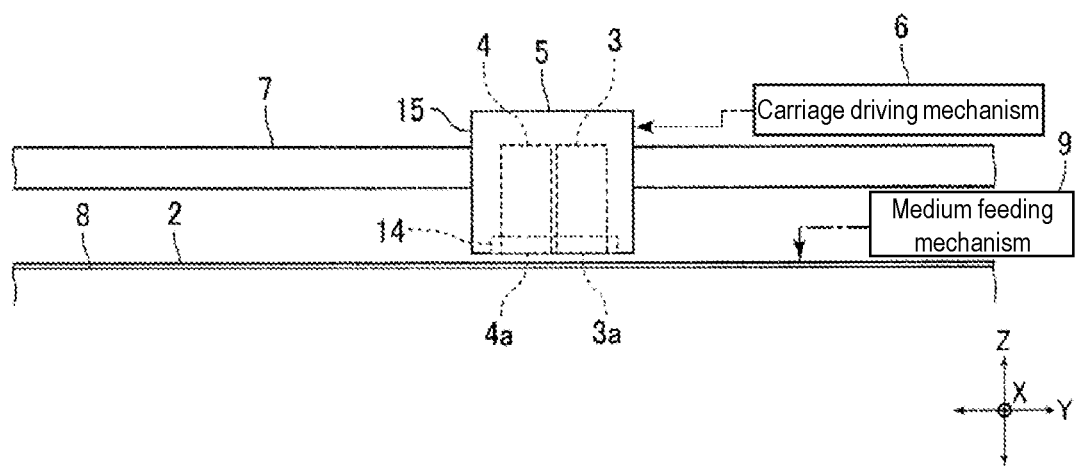
FIG. 2 is a schematic view for explaining a configuration of the inkjet printer illustrated in FIG. 1.

FIG. 1 is a perspective view of an inkjet printer 1 according to an embodiment of the present invention. FIG. 2 is a schematic view for describing the configuration of the inkjet printer 1 illustrated in FIG. 1.

The inkjet printer 1 of the present embodiment (hereinafter referred to as "printer 1") is, for example, an inkjet printer for business use, and performs printing on a print medium 2. That is, the printer 1 performs two-dimensional printing. The print medium 2 is, for example, printing paper, fabric, resin film, or the like. The printer 1 includes a plurality of inkjet heads 3 and 4 that eject ink toward the print medium 2. The printer 1 of the present embodiment includes the two inkjet heads 3 and 4 of the inkjet head 3 serving as a first inkjet head and the inkjet head 4 serving as a second inkjet head. In the following description, the inkjet head 3 is referred to as "head 3", and the inkjet head 4 is referred to as "head 4".

Furthermore, the printer 1 includes a carriage 5 on which the two heads 3 and 4 are mounted, a carriage driving mechanism 6 that moves the carriage 5 in a main scanning direction (Y direction in FIG. 1 etc.), a guide rail 7 that guides the carriage 5 in the main scanning direction, a platen 8 on which the print medium 2 at the time of printing is placed, a medium feeding mechanism 9 that feeds the print medium 2 in a sub scanning direction (X direction in FIG. 1 etc.) orthogonal to the up-down direction (Z direction in FIG. 1 etc.) and the main scanning direction, and a plurality of ink tanks 10 that store ink to be supplied to the heads 3 and 4.

The carriage driving mechanism 6 includes, for example, two pulleys, a belt stretched between the two pulleys and partially fixed to the carriage 5, and a motor that rotates the pulleys. The medium feeding mechanism 9 includes, for example, a driving roller that comes into contact with one surface of the print medium 2, a driven roller that is arranged to face the driving roller and comes into contact with the other surface of the print medium 2, a motor that rotates the driving roller, and the like.

The head 3 and the head 4 mounted on the carriage 5 are arranged at positions shifted from each other in the main scanning direction. The head 3 and the head 4 are formed in the same shape. The heads 3 and 4 mounted on the carriage 5 eject ink toward the upper surface of the print medium 2 placed on the platen 8. That is, the heads 3 and 4 eject ink downward. A plurality of nozzles for ejecting ink are formed on a lower surface of the head 3. The lower surface of the head 3 is a nozzle surface 3a on which a plurality of nozzles are formed. Similarly, a plurality of nozzles for ejecting ink are formed on a lower surface of the head 4, and the lower surface of the head 4 is a nozzle surface 4a on which the plurality of nozzles are formed.

The nozzle surfaces 3a and 4a are formed in, for example, a rectangular shape. Furthermore, for example, long side directions of the nozzle surfaces 3a and 4a formed in a rectangular shape coincide with the sub scanning direction, and short side directions of the nozzle surfaces 3a and 4a coincide with the main scanning direction. A nozzle row including a plurality of nozzles arranged in the sub scanning direction is formed on the nozzle surfaces 3a and 4a. For example, four nozzle rows arranged in the main scanning direction are formed on the nozzle surfaces 3a and 4a.

The printer 1 also includes a base member 14 that is fixed to the carriage 5 and to which the two heads 3 and 4 are attached. In the present embodiment, the heads 3 and 4, the carriage 5, the base member 14, and the like form a head unit 15. Hereinafter, the configuration of the head unit 15 will be described.

(Configuration of Head Unit)

Figure 3:
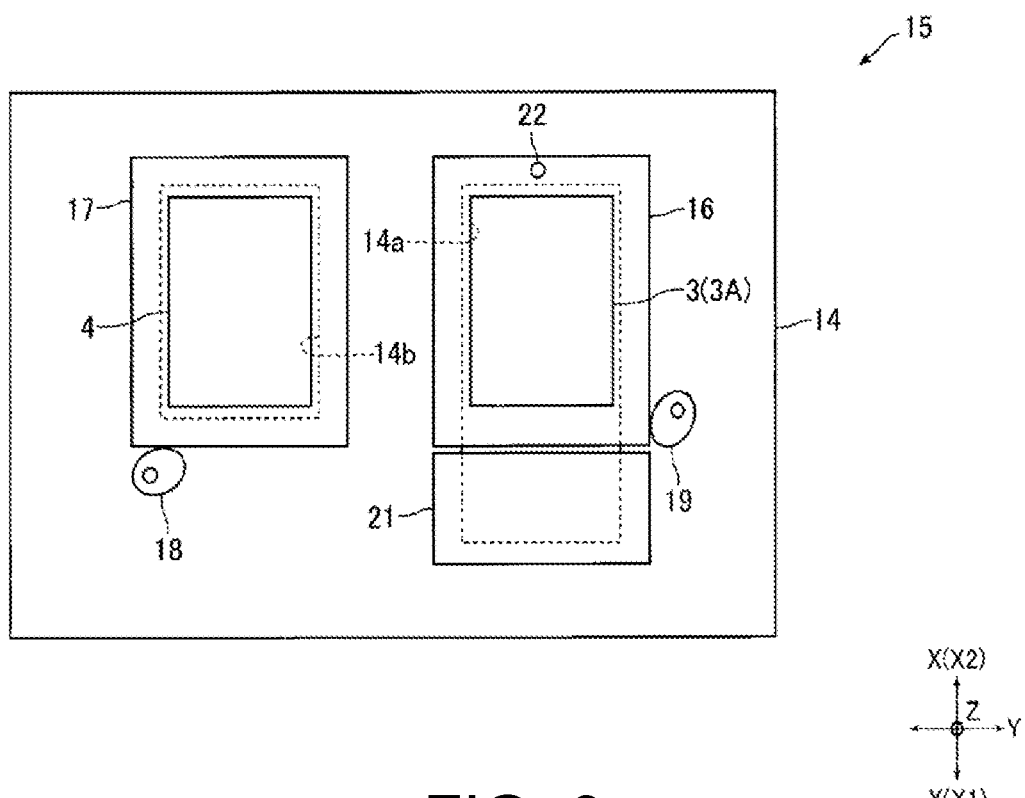
FIG. 3 is a plan view for explaining a configuration of a head unit illustrated in FIG. 2.
Figure 4:
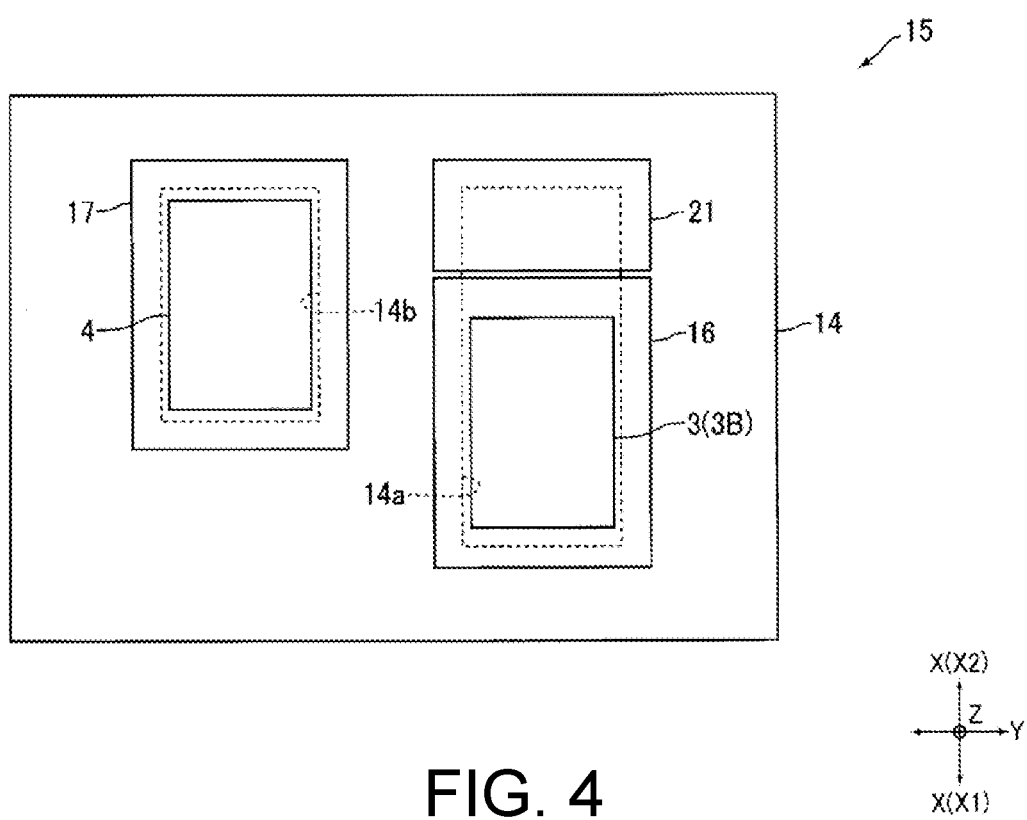
FIG. 4 is a plan view for explaining a configuration of the head unit illustrated in FIG. 2.
Figure 5:
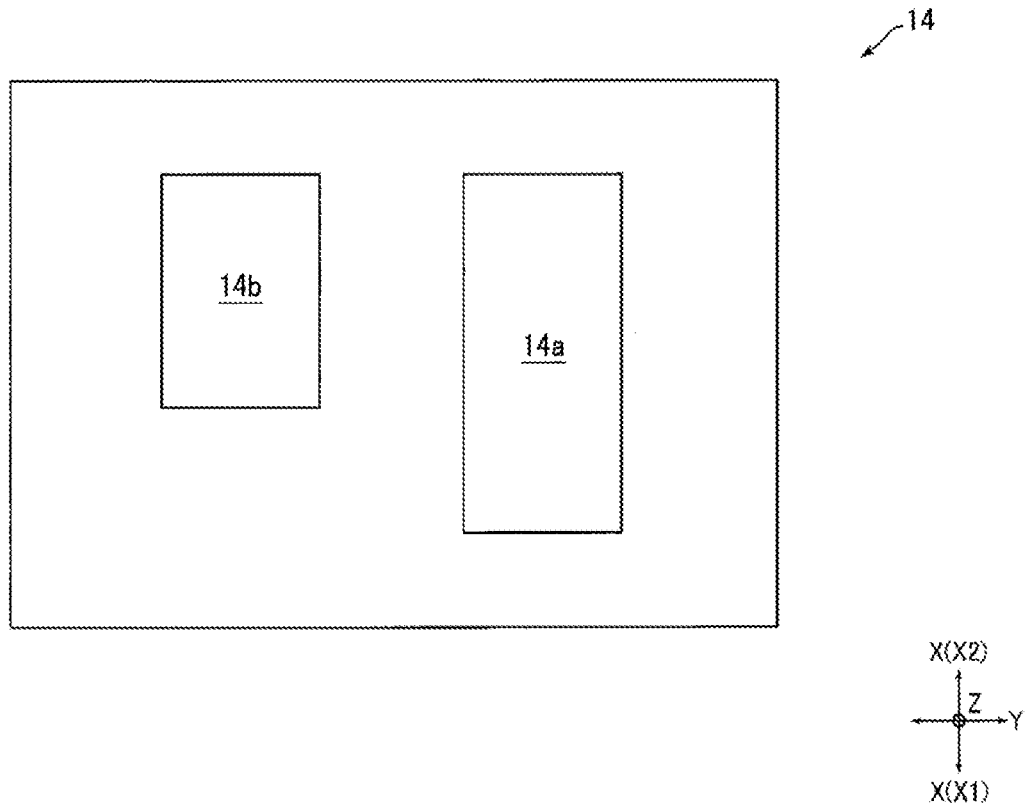
FIG. 5 is a plan view of a base member illustrated in FIG. 3.

FIGS. 3 and 4 are plan views for explaining the configuration of the head unit 15 illustrated in FIG. 2. FIG. 5 is a plan view of the base member 14 illustrated in FIG. 3. In the following description, the main scanning direction (Y direction) is assumed as a "left-right direction" and the sub scanning direction (X direction) is assumed as a "front-back direction". Furthermore, an X1 direction side in FIG. 3 and the like, which is one side in the front-back direction, is referred to as a "front" side, and an X2 direction side in FIG. 3 and the like, which is the opposite side, is referred to as a "back" side.

The head unit 15 includes the base member 14 as described above. The base member 14 is fixed to the lower end of the carriage 5 and constitutes the lower end of the head unit 15. The head unit 15 further includes a head holding member 16 to which the lower end of the head 3 is fixed, a head holding member 17 to which the lower end of the head 4 is fixed, an eccentric cam 18 for finely adjusting the position of the head 4 in the front-back direction (sub scanning direction) with respect to the base member 14, and an eccentric cam 19 for finely adjusting the position (rotation angle) of the head 3 in the turning direction with the up-down direction as the axial direction of turning with respect to the base member 14. The eccentric cam 18 of the present embodiment is a first adjustment member, and the eccentric cam 19 is a second adjustment member.

The head holding members 16 and 17 are formed in, for example, a rectangular flat plate shape. The head holding member 16 and the head holding member 17 are, for example, formed in the same shape. The outer shapes of the head holding members 16 and 17 when viewed from the up-down direction are larger than the outer shapes of the heads 3 and 4. The head holding members 16 and 17 are fixed to the upper surface side of the base member 14 with screws (not illustrated). For example, the head holding members 16 and 17 are fixed to the base member 14 with two, three, or four screws.

In the present embodiment, when the screw for fixing the head holding member 16 to the base member 14 is loosened (or the screw is removed), the head holding member 16 becomes turnable with the up-down direction as the axial direction of turning with respect to the base member 14. When a screw for fixing the head holding member 17 to the base member 14 is loosened (or removed), the head holding member 17 is movable in the front-back direction with respect to the base member 14.

As described above, the lower end of the head 3 is fixed to the head holding member 16, and the lower end of the head 3 is attached to the base member 14 by way of the head holding member 16. Similarly, the lower end of the head 4 is fixed to the head holding member 17, and the lower end of the head 4 is attached to the base member 14 by way of the head holding member 17. That is, a portion of the head 3 on the nozzle surface 3a side is attached to the base member 14 by way of the head holding member 16, and a portion of the head 4 on the nozzle surface 4a side is attached thereto by way of the head holding member 17.

The head holding member 16 is formed with an opening (not illustrated) for exposing the nozzle surface 3a of the head 3 on the lower surface side of the head unit 15. The head holding member 17 is formed with an opening (not shown) for exposing the nozzle surface 4a of the head 4 on the lower surface side of the head unit 15. The openings of the head holding members 16 and 17 pass through the head holding members 16 and 17 in the up-down direction. The openings of the head holding members 16 and 17 are formed in, for example, a rectangular shape. The widths of the openings of the head holding members 16 and 17 in the front-back direction are slightly wider than the widths of the nozzle surfaces 3a and 4a in the front-back direction, and the widths of the openings of the head holding members 16 and 17 in the left-right direction are slightly wider than the widths of the nozzle surfaces 3a and 4a in the left-right direction.

The base member 14 is formed with an opening 14a for exposing the nozzle surface 3a of the head 3 on the lower surface side of the head unit 15 and an opening 14b for exposing the nozzle surface 4a of the head 4 on the lower surface side of the head unit 15. That is, the base member 14 is formed with the two openings 14a and 14b for exposing the nozzle surfaces 3a and 4a of the two heads 3 and 4, respectively. The opening 14a of the present embodiment is a first opening for exposing the nozzle surface 3a of the head 3, which is the first inkjet head.

The openings 14a and 14b pass through the base member 14 in the up-down direction. The openings 14a and 14b are formed in a rectangular shape. The opening 14a and the opening 14b are formed so as to be adjacent to each other in the left-right direction. The width of the opening 14a in the left-right direction is equal to the width of the opening 14b in the left-right direction. The widths of the openings 14a and 14b in the left-right direction are slightly wider than the widths of the nozzle surfaces 3a and 4a in the left-right direction. The width of the opening 14b in the front-back direction is slightly wider than the width of the nozzle surface 4a in the front-back direction.

The width of the opening 14a in the front-back direction is set to a width that allows the head 3 to be arranged at a first position 3A (see FIG. 3) where the head 3 and the head 4 are arranged at the same position in the front-back direction (i.e., the heads 3 and 4 are arranged in line) and a second position 3B (see FIG. 4) where the head 3 and the head 4 are arranged at positions shifted in the front-back direction (i.e., the heads 3 and 4 are arranged in a staggered manner). That is, the width of the opening 14a in the front-back direction is wider than the width of the opening 14b in the front-back direction. For example, the width of the opening 14a in the front-back direction is about 1.5 times the width of the opening 14b in the front-back direction. The printer 1 performs printing on the print medium 2 in a state where the head 3 is arranged at the first position 3A or in a state where the head 3 is arranged at the second position 3B.

In the present embodiment, the back end of the opening 14a and the back end of the opening 14b are arranged at the same position in the front-back direction. That is, the front end of the opening 14a is arranged on the front side than the front end of the opening 14b. Therefore, the head 3 arranged at the second position 3B is shifted forward with respect to the head 4.

A portion of the opening 14a where the head 3 is not arranged is covered with a closing member 21. That is, the head unit 15 includes the closing member 21 for closing the portion of the opening 14a where the head 3 is not arranged. The closing member 21 is formed in, for example, a rectangular flat plate shape. The closing member 21 is fixed to the upper surface side of the base member 14 with a screw (not illustrated). The closing member 21 closes a front side portion of the opening 14a when the head 3 is arranged at the first position 3A (see FIG. 3), and closes a back side portion of the opening 14a when the head 3 is arranged at the second position 3B (see FIG. 4).

The eccentric cam 18 is attached to the base member 14. The eccentric cam 18 is turnable with respect to the base member 14 with the up-down direction as an axial direction of turning. The eccentric cam 18 is arranged on the front side of the head holding member 17. The eccentric cam 18 is biased toward the head holding member 17 in a turning direction of the eccentric cam 18 with respect to the base member 14 by a spring member (not illustrated), and an outer peripheral surface of the eccentric cam 18 is in contact with a front end face of the head holding member 17 at a predetermined contact pressure. In FIG. 4, illustration of the eccentric cam 18 is omitted.

The head holding member 17 is biased toward the front side by a spring member (not illustrated). When the eccentric cam 18 is turned in a state where a screw for fixing the head holding member 17 to the base member 14 is loosened (or in a state where the screw is removed), the head holding member 17 moves in the front-back direction with respect to the base member 14. That is, when the eccentric cam 18 is turned in a state where the screw for fixing the head holding member 17 to the base member 14 is loosened (or in a state where the screw is removed), the head 4 moves in the front-back direction with respect to the base member 14 together with the head holding member 17.

The eccentric cam 19 is attached to the base member 14. The eccentric cam 19 is turnable with respect to the base member 14 with the up-down direction as an axial direction of turning. The eccentric cam 19 is arranged, for example, on one side in the left-right direction of the head holding member 16. The eccentric cam 19 is biased toward the head holding member 16 in the turning direction of the eccentric cam 19 with respect to the base member 14 by a spring member (not illustrated), and the outer peripheral surface of the eccentric cam 19 is in contact with one end face in the left-right direction of the head holding member 16 at a predetermined contact pressure.

The head holding member 16 is biased toward the eccentric cam 19 in the turning direction of the head holding member 16 with respect to the base member 14 by a spring member (not illustrated). When the eccentric cam 19 is turned in a state where the screw for fixing the head holding member 16 to the base member 14 is loosened (or in a state where the screw is removed), the head holding member 16 turns with the up-down direction as the axial direction of turning with respect to the base member 14. That is, when the eccentric cam 19 is turned in a state where the screw for fixing the head holding member 16 to the base member 14 is loosened (or in a state where the screw is removed), the head 3 turns with the up-down direction as the axial direction of turning with respect to the base member 14 together with the head holding member 16. For example, when the eccentric cam 19 is turned while the head 3 is arranged at the first position 3A, the head holding member 16 and the head 3 turn with respect to the base member 14 with a fulcrum shaft 22 that turnably supports the back end portion of the head holding member 16 as a turning center.

In FIG. 4, illustration of the eccentric cam 19 and the fulcrum shaft 22 is omitted. The head unit 15 also includes an eccentric cam 19 that turns the head 3 together with the head holding member 16 when the head 3 is arranged at the second position 3B (not illustrated in FIGS. 3 and 4). That is, the head unit 15 includes the two eccentric cams 19 of the eccentric cam 19 that turns the head holding member 16 when the head 3 is arranged at the first position 3A and the eccentric cam 19 that turns the head holding member 16 when the head 3 is arranged at the second position 3B. The two eccentric cams 19 are arranged at positions shifted from each other in the front-back direction.

Main Effect of Present Embodiment

As described above, in the present embodiment, the width in the front-back direction of the opening 14a formed in the base member 14 is set to a width that enables the head 3 to be arranged at the first position 3A where the head 3 and the head 4 are arranged at the same position in the front-back direction (i.e., the heads 3 and 4 are arranged in line) and the second position 3B where the head 3 and the head 4 are arranged at positions shifted in the front-back direction (i.e., the heads 3 and 4 are arranged in a staggered manner). Thus, in the present embodiment, the heads 3 and 4 can be arranged in line and arranged in a staggered manner using the common base member 14. Therefore, in the present embodiment, even when in-line arrangement and staggered arrangement of the heads 3 and 4 are performed, versatility of the base member 14 can be enhanced.

Furthermore, in the present embodiment, since the heads 3 and 4 can be arranged in line and can be arranged in a staggered manner using the common base member 14, it is not necessary to replace the base member 14 when switching the arrangement of the heads 3 and 4 from the in-line arrangement to the staggered arrangement and when switching the arrangement of the heads 3 and 4 from the staggered arrangement to the in-line arrangement. Therefore, in the present embodiment, even when in-line arrangement and staggered arrangement of the heads 3 and 4 are performed, switching from the in-line arrangement to the staggered arrangement and switching from the staggered arrangement to the in-line arrangement can be easily performed.

Note that in the present embodiment, when the printer 1 performs printing on the print medium 2 in a state where the head 3 is arranged at the first position 3A, printing on the print medium 2 can be easily performed using inks of specific colors such as light colors and orange in addition to primary colors such as CMYK. Furthermore, when the printer 1 performs printing on the print medium 2 in a state where the head 3 is arranged at the second position 3B, it is possible to enjoy the advantage of the staggered arrangement.

In the present embodiment, a portion of the opening 14a where the head 3 is not arranged is closed by the closing member 21. Therefore, in the present embodiment, even if the width of the opening 14a in the front-back direction is wide in order to enable in-line arrangement and staggered arrangement of the heads 3 and 4, it is possible to prevent dust and ink mist from entering the inside of the carriage 5 from the opening 14a.

In the present embodiment, the head unit 15 includes the eccentric cam 18 for finely adjusting the position of the head 4 in the front-back direction with respect to the base member 14, and the eccentric cam 19 for finely adjusting the turning angle of the head 3 with respect to the base member 14. Therefore, in the present embodiment, it is possible to suppress positional shift of the heads 3 and 4 with respect to the base member 14 and positional shift between the head 3 and the head 4. Therefore, in the present embodiment, the print quality of the printer 1 can be improved.

OTHER EMBODIMENTS

The embodiment described above is an example of a preferred embodiment of the present invention, but the present invention is not limited thereto, and various modified examples can be made without a scope of not changing the gist of the present invention.

Figure 6A:
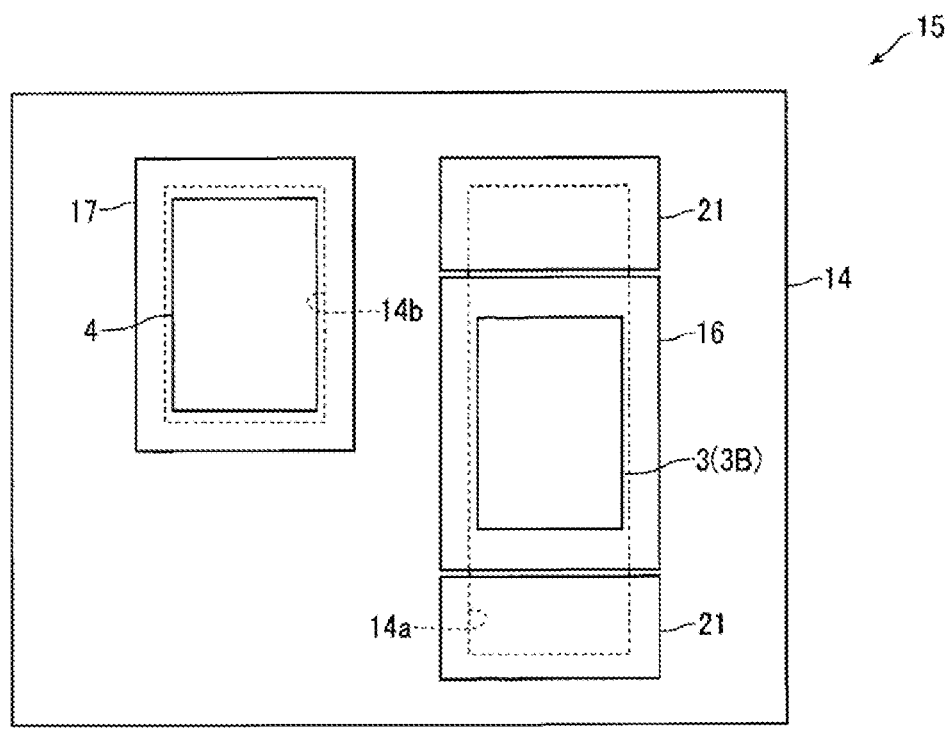
FIG. 6A and FIG. 6B are plan views for explaining a configuration of a head unit according to another embodiment of the present invention.
Figure 6B:
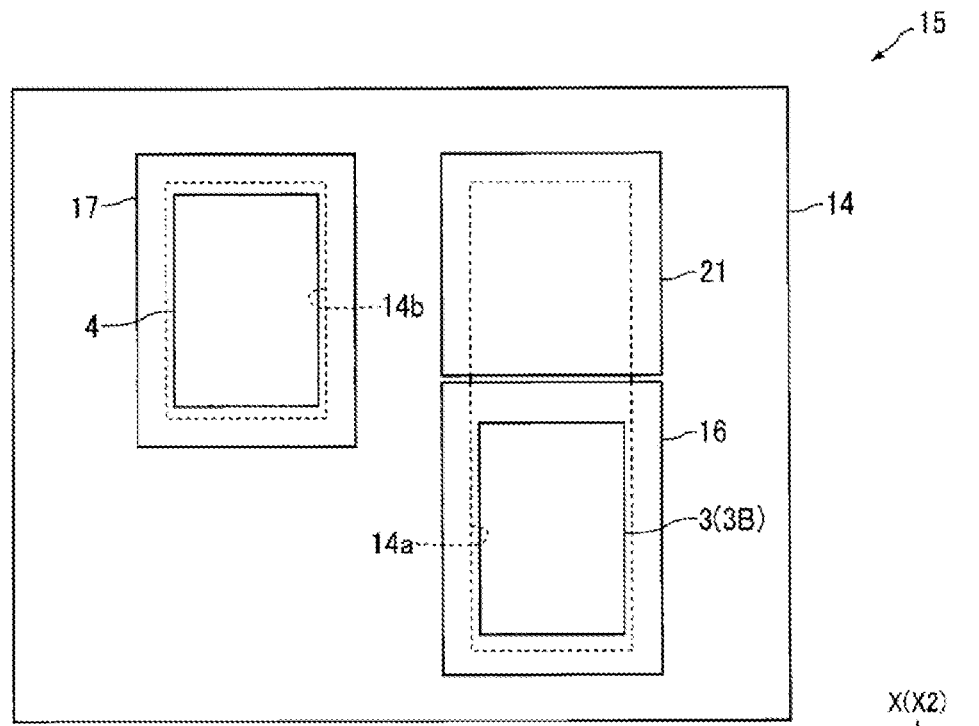

In the embodiment described above, for example, as illustrated in FIG. 6A and FIG. 6B, the width of the opening 14a in the front-back direction may be wider. In this case, as illustrated in FIG. 6A, the back end of the head 3 arranged at the second position 3B can be arranged on the back side than the front end of the head 4, and as shown in FIG. 6B, the back end of the head 3 arranged at the second position 3B can be arranged on the front side than the front end of the head 4. That is, in the example illustrated in FIG. 6A and FIG. 6B, the head 3 can be more flexibly arranged.

Furthermore, when the width of the opening 14a in the front-back direction is wider, as illustrated in FIG. 6A, a portion of the opening 14a where the head 3 is not arranged may be covered with two closing members 21. That is, the head unit 15 may include the closing member 21 for closing the portion of the opening 14a on the front side than the head holding member 16, and the closing member 21 for closing the portion of the opening 14a on the back side than the head holding member 16.

In the embodiment described above, the front end of the opening 14a and the front end of the opening 14b may be arranged at the same position in the front-back direction, and the back end of the opening 14a may be arranged on the back side than the back end of the opening 14b. In this case, the head 3 arranged at the second position 3B is shifted backward with respect to the head 4. Furthermore, in the embodiment described above, the width of the opening 14b in the front-back direction may have a width of the same extent as the width of the opening 14a in the front-back direction. In this case, the head 3 arranged at the second position 3B may be shifted forward or may be shifted backward with respect to the head 4.

In the embodiment described above, the number of inkjet heads mounted on the carriage 5 may be three or more. In this case, three or more inkjet heads are attached to the base member 14, and the base member 14 is formed with a plurality of openings for exposing the respective nozzle surfaces of the plurality of inkjet heads on the lower surface side of the head unit 15. For example, four inkjet heads are attached to the base member 14, and as illustrated in FIG. 7, the base member 14 is formed with four openings 14a, 14b, 14c, and 14d for exposing the respective nozzles of the four inkjet heads, respectively.

Figure 7:
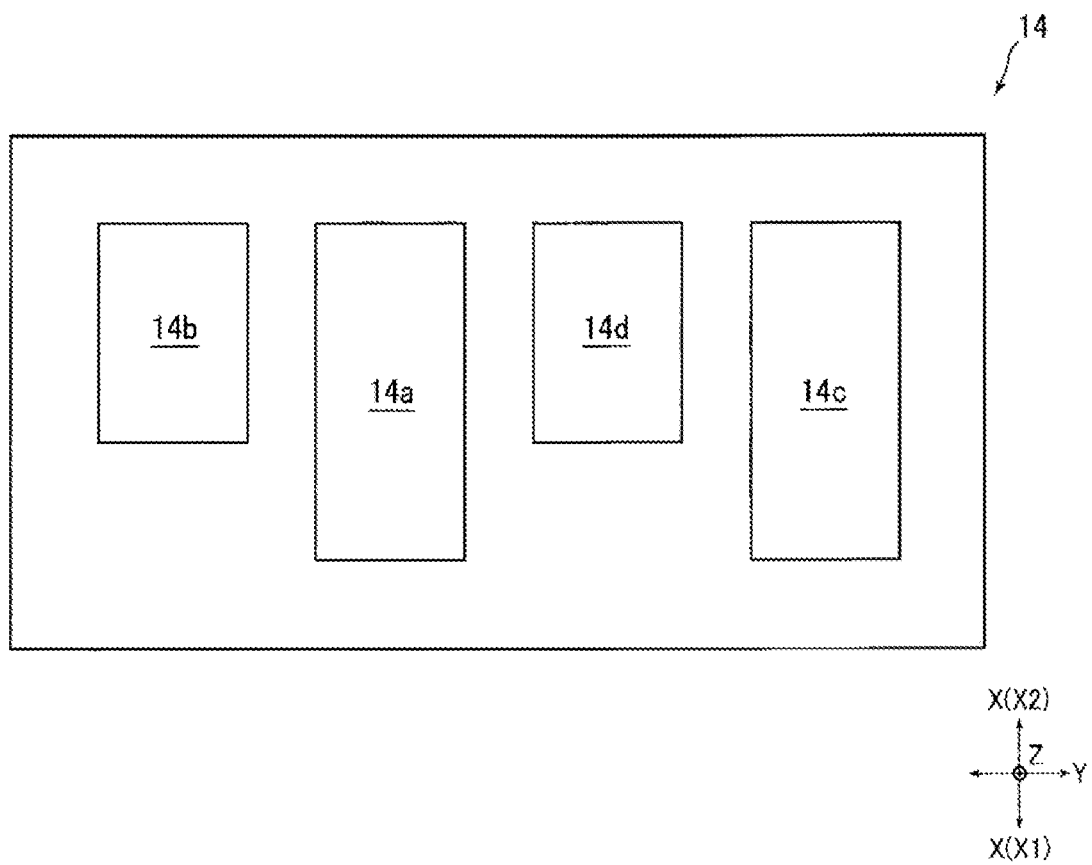
FIG. 7 is a plan view for explaining a configuration of a head unit according to still another embodiment of the present invention.

In the example illustrated in FIG. 7, the opening 14b, the opening 14a, the opening 14d, and the opening 14c are formed in this order from one side to the other side in the left-right direction. Furthermore, the opening 14c is formed in the same shape as the opening 14a, and the opening 14d is formed in the same shape as the opening 14b. The widths of the openings 14a and 14c in the front-back direction are wider than the widths of the openings 14b and 14d in the front-back direction. In this case, the openings 14a and 14c are first openings, and the inkjet head whose nozzle surface is exposed through the openings 14a and 14c is the first inkjet head. Furthermore, the inkjet head whose nozzle surface is exposed through the openings 14b and 14d is a second inkjet head. Note that in the example illustrated in FIG. 7, the opening 14b, the opening 14a, the opening 14c, and the opening 14d may be formed in this order from one side to the other side in the left-right direction.

In the embodiment described above, the head unit 15 may include an adjustment member for adjusting the heights of the heads 3 and 4 with respect to the base member 14, or may include an adjustment member for adjusting the positions of the heads 3 and 4 with respect to the base member 14 in the turning direction having the horizontal direction as an axial direction of turning. The adjustment member in these cases is, for example, a screw that engages with the base member 14. In the embodiment described above, the head unit 15 need not include the eccentric cam 18, or need not include the eccentric cam 19.

In the embodiment described above, the portion of the opening 14a where the head 3 is not arranged need not be covered with the closing member 21. That is, the head unit 15 need not include the closing member 21. In the embodiment described above, the lower ends of the heads 3 and 4 may be directly attached to the base member 14. In the embodiment described above, the printer 1 may include, instead of the platen 8 and the medium feeding mechanism 9, a table on which the print medium 2 is placed, and a table driving mechanism that moves the table in at least one of the front-back direction and the up-down direction.

In the embodiment described above, the printer 1 may be a 3D printer that manufactures a three-dimensional shaped object. In this case, the printer 1 includes a table on which the three-dimensional shaped object is placed. When the printer 1 is a 3D printer, the printer 1 manufactures a three-dimensional shaped object in a state where the head 3 is arranged at the first position 3A. When the printer 1 manufactures the three-dimensional shaped object, it is necessary to use more types of ink than two-dimensional printing such as a model material and a support material in addition to the color ink, but by manufacturing the three-dimensional shaped object in a state where the head 3 is arranged at the first position 3A, it becomes possible to eject many types of ink in line. Thus, in the case of the printer 1 including the head unit 15, a configuration suitable as a printer that performs both printing on the print medium 2 and manufacturing of three-dimensional shaping can be obtained.

The invention claimed is:

1. A head unit comprising:
a inkjet head including a first inkjet head and a second inkjet head for ejecting ink;
a carriage on which the inkjet head is mounted; and
a base member fixed to the carriage and to which the inkjet head is attached, wherein the inkjet head is attached to the base member, and an opening for exposing a nozzle surface of the inkjet head is formed in the base member,
a width of the opening in a sub scanning direction orthogonal to a main scanning direction that is a moving direction of the carriage is set to be switchable between an in-line arrangement and a staggered arrangement,
wherein the first inkjet head and the second inkjet head are arranged at the same position in the sub scanning direction in the in-line arrangement, and
the first inkjet head and the second inkjet head are arranged at positions shifted in the sub scanning direction in the staggered arrangement.

2. The head unit as set forth in claim 1, further comprising a first adjustment member for finely adjusting, with respect to the base member, a position in the sub scanning direction of at least one inkjet head of the plurality of inkjet heads.

3. The head unit as set forth in claim 1, further comprising a second adjustment member for finely adjusting, with respect to the base member, a position of at least one inkjet head of the plurality of inkjet heads in a turning direction with an up-down direction as an axial direction of turning.

4. An inkjet printer comprising:
the head unit as set forth in claim 1; and
a carriage driving mechanism that moves the carriage in a main scanning direction.

5. The inkjet printer as set forth in claim 4, wherein printing is performed on a print medium in a state where the first inkjet head is arranged at the first position or the second position, and a three-dimensional shaped object is manufactured in a state where the first inkjet head is arranged at the first position.

6. The head unit as set forth in claim 2, further comprising a second adjustment member for finely adjusting, with respect to the base member, a position of at least one inkjet head of the plurality of inkjet heads in a turning direction with an up-down direction as an axial direction of turning.

7. A head unit comprising:
a plurality of inkjet heads each having a nozzle surface on which a plurality of nozzles for ejecting ink are formed;
a carriage on which the plurality of inkjet heads are mounted;
a base member fixed to the carriage and to which the plurality of inkjet heads are attached; and
a closing member,
wherein
portions of the plurality of inkjet heads on the nozzle surface side are attached to the base member, and a plurality of openings for exposing the respective nozzle surfaces of the plurality of inkjet heads are formed in the base member, and
assuming that a predetermined inkjet head among the plurality of inkjet heads is a first inkjet head, the inkjet head excluding the first inkjet head among the plurality of inkjet heads is a second inkjet head, and the opening for exposing the nozzle surface of the first inkjet head is a first opening,
a width of the first opening in a sub scanning direction orthogonal to a main scanning direction that is a moving direction of the carriage and an up-down direction is set to a width at which the first inkjet head is arrangeable at a first position where the first inkjet head and the second inkjet head are arranged at the same position in the sub scanning direction and a second position where the first inkjet head and the second inkjet head are arranged at positions shifted in the sub scanning direction,
wherein the closing member that closes a portion of the first opening where the first inkjet head is not arranged.

8. The head unit as set forth in claim 7, wherein the two inkjet heads of the first inkjet head and the second inkjet head are attached to the base member, and the two openings are formed in the base member, and
a width in the sub scanning direction of the first opening, which is one of the two openings, is wider than a width in the sub scanning direction of the other opening.

9. The head unit as set forth in claim 7, further comprising a first adjustment member for finely adjusting, with respect to the base member, a position in the sub scanning direction of at least one inkjet head of the plurality of inkjet heads.

10. The head unit as set forth in claim 8, further comprising a first adjustment member for finely adjusting, with respect to the base member, a position in the sub scanning direction of at least one inkjet head of the plurality of inkjet heads.

11. The head unit as set forth in claim 7, further comprising a second adjustment member for finely adjusting, with respect to the base member, a position of at least one inkjet head of the plurality of inkjet heads in a turning direction with an up-down direction as an axial direction of turning.

12. The head unit as set forth in claim 8, further comprising a second adjustment member for finely adjusting, with respect to the base member, a position of at least one inkjet head of the plurality of inkjet heads in a turning direction with an up-down direction as an axial direction of turning.

13. The head unit as set forth in claim 9, further comprising a second adjustment member for finely adjusting, with respect to the base member, a position of at least one inkjet head of the plurality of inkjet heads in a turning direction with an up-down direction as an axial direction of turning.

14. The head unit as set forth in claim 10, further comprising a second adjustment member for finely adjusting, with respect to the base member, a position of at least one inkjet head of the plurality of inkjet heads in a turning direction with an up-down direction as an axial direction of turning.

15. An inkjet printer comprising:
the head unit as set forth in claim 7; and
a carriage driving mechanism that moves the carriage in a main scanning direction.

16. A head unit comprising:
a plurality of inkjet heads each having a nozzle surface on which a plurality of nozzles for ejecting ink are formed;
a carriage on which the plurality of inkjet heads are mounted; and
a base member fixed to the carriage and to which the plurality of inkjet heads are attached, wherein
portions of the plurality of inkjet heads on the nozzle surface side are attached to the base member, and a plurality of openings for exposing the respective nozzle surfaces of the plurality of inkjet heads are formed in the base member, and
assuming that a predetermined inkjet head among the plurality of inkjet heads is a first inkjet head, the inkjet head excluding the first inkjet head among the plurality of inkjet heads is a second inkjet head, and the opening for exposing the nozzle surface of the first inkjet head is a first opening,
a width of the first opening in a sub scanning direction orthogonal to a main scanning direction that is a moving direction of the carriage and an up-down direction is set to a width at which the first inkjet head is arrangeable at a first position where the first inkjet head and the second inkjet head are arranged at the same position in the sub scanning direction and a second position where the first inkjet head and the second inkjet head are arranged at positions shifted in the sub scanning direction,
wherein the two inkjet heads of the first inkjet head and the second inkjet head are attached to the base member, and the two openings are formed in the base member, and
a width in the sub scanning direction of the first opening, which is one of the two openings, is wider than a width in the sub scanning direction of the other opening.

17. The head unit as set forth in claim 16, further comprising a first adjustment member for finely adjusting, with respect to the base member, a position in the sub scanning direction of at least one inkjet head of the plurality of inkjet heads.

18. The head unit as set forth in claim 16, further comprising a second adjustment member for finely adjusting, with respect to the base member, a position of at least one inkjet head of the plurality of inkjet heads in a turning direction with an up-down direction as an axial direction of turning.

19. The head unit as set forth in claim 17, further comprising a second adjustment member for finely adjusting, with respect to the base member, a position of at least one inkjet head of the plurality of inkjet heads in a turning direction with an up-down direction as an axial direction of turning.

20. An inkjet printer comprising:
the head unit as set forth in claim 16; and
a carriage driving mechanism that moves the carriage in a main scanning direction.

* * * * *